J. E. LINGENFELTER.
ANIMAL TRAP.
APPLICATION FILED MAR. 23, 1915.
1,164,369.
Patented Dec. 14, 1915.
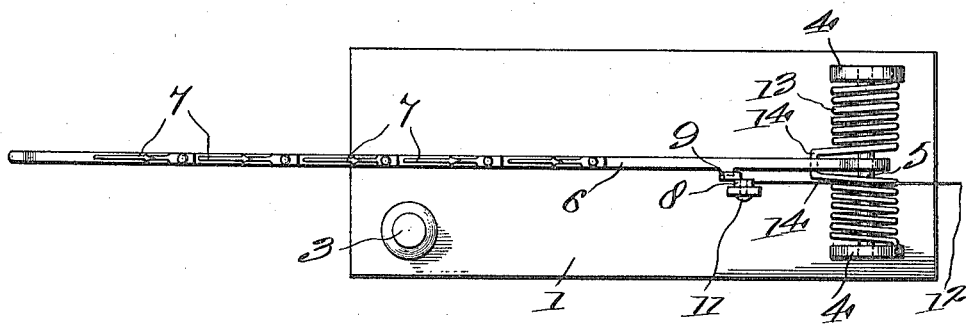
Witnesses
Edwin J Beller
R. J. McWhinney
Inventor
J. E. Lingenfelter,
By Wilkinson, Guista & MacKaye
Attorneys.

UNITED STATES PATENT OFFICE.

JOHN E. LINGENFELTER, OF CLARKSTON, WASHINGTON.

ANIMAL-TRAP.

1,164,369.

Specification of Letters Patent. Patented Dec. 14, 1915.

Application filed March 23, 1915. Serial No. 16,469.

*To all whom it may concern:*

Be it known that I, JOHN E. LINGENFELTER, a citizen of the United States, residing at Clarkston, in the county of Asotin and State of Washington, have invented certain new and useful Improvements in Animal-Traps; and I do hereby declare the following to be a full, clear, and exact description of the invention, such as will enable others skilled in the art to which it appertains to make and use the same.

The present invention relates to improvements in animal traps, and has for an object to provide an improved trap for catching coyotes and the like animals.

A further object of the present invention resides in providing an improved trap which will be movable to permit the animal to run around in a circle after being caught, to prevent the possibility of the animal tearing itself loose from the hooks, which is a disadvantage of rigidly mounted traps.

It is a still further object of the present invention to provide an improved animal trap which is arranged to be sprung by the animal itself, and is automatically movable to bring the impaling arm into the path of the animal so as to assure the effective operation of the trap.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a top plan view of a trap constructed in accordance with the present invention, and shown in set position; and Fig. 2 is a side elevational view, partly in section, of the same.

Referring more particularly to the drawings, wherein one embodiment of the invention is illustrated, 1 designates the base of the improved trap, advantageously consisting of sheet metal; the same being supported elevated from the ground by a ferrule 2, and anchored at one corner thereof by a stake 3, about which the ferrule and base are freely revoluble.

At its free end the base 1 is provided with a pair of upstanding ears 4, perforated to receive a pin 5 on which is mounted the impaling arm 6 of the trap. To the impaling arm 6 are secured one or a series of hooks 7, having barbed points disposed substantially diagonal with respect to the plane of said arm, in order to strike the animal at substantially right angles when the arm is swung over, as hereinafter described.

The impaling arm 6 is normally held in set position, as indicated in the drawings, by a lever 8 provided with a lug 9 arranged to engage a projection 10 on said arm. The lever 8 is pivoted on the base 1, as indicated at 11, and is connected at its upper end to a thread or cord 12, preferably a fine silk thread secured at its other end to any suitable object, so as to extend across the runway of the animals.

The impaling arm 6 of the trap is held in the set position shown, against the influence of an actuating spring 13 coiled about the pin 5, with its free ends secured in the respective ears 4, and provided with a central looped portion 14 engaged beneath the arm 6.

In operation, when an animal runs against the cord or thread 12, the lever 8 is rocked about its pivotal connection 11, and operates to withdraw the lug 9 from engagement with the projection 10, releasing the impaling arm 6 to the action of the coil spring 13, which swings the arm over about the pin 5 as a center. The spring 13 is arranged to be sufficiently strong to bury the hooks 7 in the animal's body, and for this purpose the spring may advantageously consist of two or more distinct coils connected to the arm 6, as found desirable in practice.

In order to prevent possible escape from the trap, or failure of the impaling arm 6 to strike its object, the improved trap is arranged to be movable about the stake 3, and will be so actuated when the animal runs against the cord or thread 12, to automatically maintain the impaling arm 6 directly in the path of the animal. After the trap has been sprung and the animal caught by the hooks 7, it will be permitted to run around in a circle about the stake 3 breaking the thread 12, thereby wearing the animal out and preventing the likelihood of its tearing away from the hooks 7, as would be possible if the trap were rigidly mounted.

It is obvious that those skilled in the art may vary the details of construction and arrangements of parts without departing from the spirit of my invention, and therefore I do not wish to be limited to such features except as may be required by the claims.

I claim:

1. An animal trap comprising a base, means for anchoring said base for free horizontal revolution, a spring-pressed impaling arm mounted on said base, a trigger for normally maintaining said impaling arm in set position, and a line stretched across the animal runway and connected to actuate said trigger for releasing the impaling arm and moving said base to constantly maintain the impaling arm in alinement with the animal's body, substantially as described.

2. An animal trap comprising a base anchored for revolution, means for supporting said base above the ground, an impaling arm, spring means associated with said impaling arm for actuating the same, hooks provided on said impaling arm, a trigger for maintaining said arm in set position, and a line stretched across the animal runway and connected to actuate said trigger for releasing the impaling arm, substantially as described.

3. An animal trap comprising a base, means for supporting said base elevated from the ground, means associated with said first-named means for anchoring said base for horizontal revolution, an arm journaled on said base, a series of diagonally-disposed hooks provided on said arm, a trigger pivoted on said base to swing substantially parallel with said arm, connections between said trigger and arm for maintaining the latter in set position, spring means for moving said arm to strike the animal when the trigger is released, and a line stretched across the animal runway and connected to actuate said trigger in releasing the arm and moving said base to constantly maintain the arm in alinement with the animal's body, substantially as described.

In testimony whereof, I affix my signature, in presence of two witnesses.

JOHN E. LINGENFELTER.

Witnesses:
 FRED M. HINKEY,
 WM. T. AVERY.

Copies of this patent may be obtained for five cents each, by addressing the "Commissioner of Patents, Washington, D. C."